United States Patent [19]

Hert

[11] Patent Number: 4,623,567

[45] Date of Patent: Nov. 18, 1986

[54] COMPOSITIONS OF ETHYLENE POLYMERS FOR THE MANUFACTURE OF FILMS

[75] Inventor: Marius Hert, Aubigny en Artois, France

[73] Assignee: Societe Chimique des Charbonnages, S.A., France

[21] Appl. No.: 500,955

[22] Filed: Jun. 3, 1983

[30] Foreign Application Priority Data

Jun. 3, 1982 [FR] France ............................ 82 09634

[51] Int. Cl.[4] .................... C08L 23/06; C08L 23/08; C08L 23/20
[52] U.S. Cl. .................................. 428/36; 428/220; 428/364; 525/240; 525/222
[58] Field of Search ............... 525/240, 222; 428/220, 428/36

[56] References Cited

U.S. PATENT DOCUMENTS

| | | | |
|---|---|---|---|
| 4,243,619 | 1/1981 | Fraser et al. | 260/40.6 |
| 4,339,507 | 7/1982 | Kurtz et al. | 525/240 |
| 4,429,079 | 1/1984 | Shibata et al. | 525/240 |

FOREIGN PATENT DOCUMENTS

| | | |
|---|---|---|
| 0014539 | 8/1980 | European Pat. Off. . |
| 0043743 | 1/1982 | European Pat. Off. . |
| 52889 | 5/1982 | European Pat. Off. . |
| 2481709 | 6/1981 | France . |
| 2077243 | 12/1981 | United Kingdom . |

*Primary Examiner*—Carman J. Seccuro
*Attorney, Agent, or Firm*—Finnegan, Henderson, Farabow, Garrett & Dunner

[57] ABSTRACT

A composition comprising from 25 to 95 weight percent of at least one free-radical ethylene polymer and from 5 to 75 weight percent of at least one ethylene α-olefin copolymer, wherein the α-olefin contains at least 4 carbon atoms, wherein the copolymer has a specific gravity between 0.905 and 0.940 and a melt index between 0.4 and 3 dg/min, and wherein the free-radical ethylene polymer has a melt index between 0.15 and 3 dg/min. Application to the manufacture of films having a thickness between 8 and 200 microns and other applications.

12 Claims, No Drawings

COMPOSITIONS OF ETHYLENE POLYMERS FOR THE MANUFACTURE OF FILMS

BACKGROUND OF THE INVENTION

The present invention relates to compositions of free-radical polyethylene and ethylene/α-olefin copolymers and to the application of these compositions to the manufacture of films, to the sheathing of telephonic cables, and to the manufacture of retractable housings.

European Pat. No. 0,052,889 describes the application of a coating to a substrate at a temperature of at least 232° C. The coating has a thickness less than 12.5 μm and is made of 20 to 98 weight percent polyethylene obtained under high pressure and having a specific gravity lower than 0.93 and a melt index between 4 and 6.3 dg/min; and from 2 to 80 weight percent of at least one ethylene/α-olefin copolymer. The α-olefin has from 3 to 8 carbon atoms. The copolymer has a melt index between 0.5 and 100 dg/min, a polydispersity index (defined by the ratio Mw/Mn of the weight-average molecular weight to the number-average molecular weight) between 2.7 and 4.1, a total unsaturation ratio between 0.1 and 0.3 double bonds per 1000 carbon atoms, and a specific gravity between 0.912 and 0.940.

French Pat. No. 2,481,709 describes a mixture comprising: (a) from 30 to 80 weight percent of an ethylene/α-olefin copolymer having from 3 to 12 carbon atoms, the copolymer having a specific gravity lower than 0.945 and an instrinsic vicosity, measured at 135° C., of between 1.7 and 10 dl/g; and (b) from 20 to 70 weight percent polyethylene obtained under high pressure, which has a specific gravity of between 0.915 and 0.935 and an intrinsic vicosity, measured at 135° C., lower than 1.3 dl/g. An intrinsic vicosity, measured at 135° C., higher than 1.7 dl/g for an ethylene/α-olefin copolymer, corresponds to a melt index (measured according to standard specification ASTM D 1238-73) lower than 0.3 dg/min.

U.S. Pat. No. 3,176,052 describes a homogeneous mixture comprising: (a) from 5 to 75 weight percent of a polyethylene obtained by a free-radical mechanism, having a specific gravity between 0.91 and 0.94; and (b) from 25 to 95 weight percent of an ethylene/αolefin copolymer with a specific gravity higher than 0.92 and a melt index between 0.1 and 10 dg/min. This patent shows that the improvement of the gloss of an extruded film obtained from such a mixture, compared with extruded films obtained from each constituent of the mixture, is more pronounced with higher melt index (from 3 to 10 dg/min according to the examples) of the polyethylene obtained by a free-radical mechanism and higher with lower melt index (from 0.5 to 1.4 dg/min, according to the examples) of the copolymer.

Extruded films are also known that are prepared from polyethylene obtained by a radical mechanism and which have a thickness of at least 20 μm.

SUMMARY OF THE INVENTION

An object of the invention is to provide a composition useful for films that does not have the limitations of the prior art.

Another object of the invention is to provide a composition suitable for making improved sheathing for telephonic cables and retractable housing.

Additional objects and advantages of the invention will be set forth in part in the description that follows, and in part will be obvious from the description, or may be learned by practice of the invention. The objects and advantages of the invention may be realized and attained by means of the combinations particularly pointed out in the appended claims.

To achieve the foregoing objects and in accordance with the purpose of the invention, as embodied and broadly described herein, the invention includes a composition comprising from 25 to 95 weight percent of at least one free-radical ethylene polymer and from 5 to 75 weight percent of at least one ethylene/α-olefin copolymer, wherein the α-olefin contains at least four carbon atoms, wherein the copolymer has a specific gravity between 0.905 and 0.940 and a melt index between 0.4 and 3 dg/min, and wherein the free-radical ethylene polymer has a melt index between 0.15 and 3 dg/min.

DESCRIPTION OF THE PREFERRED EMBODIMENTS

Reference will now be made to the presently preferred embodiments of the invention.

In several applications, the invention improves useful properties, when compared to each constituent of the invention taken separately, while avoiding the contraints and limitations of the prior art in several applications. For example, the ethylene/α-olefin copolymer does not need a polydispersity index between 2.7 and 4.1, or a total unsaturation ratio between 0.1 and 0.3 double bonds per 1000 carbon atoms. The ethylene/α-olefin copolymer does not need, as in French Pat. No. 2,481,709, a melt index lower than 0.3 dg/min. Such an index is difficult to obtain when using most of the known copolymerization processes.

The expression "free-radical ethylene polymer" means the product obtained by the polymerization under high pressure (generally 1,000 to 4,000 bars) and high temperature (140° C. to 350° C.), in the presence of a free-radical initiator (such as oxygen, peroxides or peresters), of ethylene and, if appropriate, small amounts of at least one monomer copolymerizable with ethylene, such as, for example, carbon monoxide, ethylenically unsaturated carboxylic acids, esters derived from such acids and from an alcohol having from 1 to 8 carbon atoms, maleic anhydride, vinyl acetate or other such compounds. A free-radical ethylene polymer having a specific gravity of between 0.91 and 0.94 is preferred.

An especially suitable ethylene/α-olefin copolymer has an average proportion of α-olefin units between 1 and 8 mole percent and has a heterogeneous distribution of the α-olefin units. The copolymer comprises crystalline fractions and amorphous fractions, and the proportion of α-olefin units in the copolymer varies between at least 0.2 and at most 5 times the average proportion of α-olefin units depending on the fractions considered. These copolymers, described in European Patent Application No. 0,070,220, which corresponds to French Pat. No. 2,509,315, have a melting peak of between 118° C. and 130° C. in their crystalline fractions and the crystalline fractions represent from 20 to 50 weight percent of the total copolymer. The copolymers also have a total unsaturation ratio between 0.25 and 0.50 double bonds per 1000 carbon atoms, and preferably between 0.32 and 0.45 double bonds per 1000 carbon atoms.

In the remainder of this description, the term "copolymer" will be employed to denote both binary polymers containing an α-olefin in addition to ethylene, and ternary polymers containing two α-olefins and ethylene. The copolymers which may be used in the present invention have an average molecular weight between 15,000 and 60,000 and/or a polydispersity index between 3 and 9 in the case of binary polymers and between 4 and 12 in the case of ternary polymers. As is conventional in the art of polymers, the average molecular weight means the number-average molecular weight, Mn, and the polydispersity index means the ratio Mw/Mn of the weight-average molecular weight to the number-average molecular weight.

The α-olefins that can form part of the heterogeneous copolymers of the invention are, for example, but-1-ene, hex-1-ene, 4-methylpent-1-ene, and oct-1-ene. If two α-olefins are simultaneously present in the copolymer, as in a terpolymer, the total average proportion of both α-olefins is between 1 and 8 mole percent, as described above, and the ratio of their respective average proportions is preferably between 0.25 and 4. Thus, for example, if an ethylene/but-1-ene/hex-1-ene terpolymer is used in the invention, comprising 95 mole percent ethylene units on average, then the copolymer may comprise from 1 to 4 mole percent but-1-ene units on average and from 4 to 1 mole percent hex-1-ene units.

The process of the invention for producing copolymers consists in copolymerizing ethylene and the alpha-olefins with at least 4 C atoms in at least one reactor comprising at least one zone at a temperature between 180° and 32° C. and at a pressure between 300 and 2,500 bars, by means of a Ziegler type catalytic system comprising on one hand an activator selected from the hydrides and the organo-metallic compounds of the groups I through III of the periodic table, and on the other hand at least one halogenated compound of a transition metal, characterized in that on one hand the gas flow feeding the reactor consists in the stationary state of 35 to 80% by weight of ethylene and of 20 to 65% by weight of alpha-olefin, and on the other hand that the catalytic system is far more reactive toward the ethylent, preferably 5 to 15 times more reactive, than to the alpha-olefin. In an illustrative example implying no limitation, such a compound is of the formula

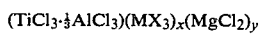

wherein $0.3 \leq x \leq 3$, $0 \leq y \leq 20$, M is a transition metal of the VB and VIB groups of the periodic table and X is a halogen. These catalysts have a binary solid solution structure Ti-M which can be characterized by the dimension of its crystallites. It was found with respect to the effectiveness of these catalysts that this dimension determined by radiocrystallographic analysis (Sherrer's law) in the direction perpendicualr to the (300) plane preferably just be equal to or less than 100 angstroms (Å). As can been seen in the light of their formula, these catalysts for $y > 0$ can be fastened on an inert support consisting of a halide of anhydrous magnesium, Among the metals M, vanadium and chromium are preferred, but molybdemum and tungsten can also be used. The halogen of the magnesium halide and that of the M metal halide can be identical or different and are selected from fluorine, chlorine, bromine and iodine.

A production process of such compounds consists in putting syn-crystallized titanium trichloride in contact with aluminum chloride, the M metal halide and possibly the anhydrous magnesium halide, for a sufficiently long time that the crystallite dimension (determined as above) of the solid solution be less than 100 Å. This can be efficiently done by subjecting the three above chlorides to a grinding stage wherein the grinding power would be at least 3 kwh per kg of treated solid. More specifically, it has been found that the effectiveness of these compond is higher the larger this grinding power. However, in order to optimize this effectiveness taking into account the operational costs and the need to save energy, the grinding energy as a rule need not exceed 25 kwh per kg of solid.

The proportions of the activator and of transition-metal halide compound are so selected that the atomic ratio of activator metal to transition metal (in the case above to the sum Ti+M) be within 1 to 10. The means dwell time of the catalytic system in the polymerization reactor as a rule is between 2 and 100 seconds. This dwell time depends on the temperature in the reactor in the sense that it will be longer the lower the temperature. The preferred activators on one hand are the trialkyl aluminums and on the other hand the alkyl-siloxalanes such as those described in the U.S. Pat. No. 3,969,332.

The composition of the gas flow feeding the reactor when in its stationary mode as characterized in the process of the invention must be understood to be an average composition over the whole reactor, this composition of course not necessarily being uniform and possibly varying along the reactor, in particular when the reactor comprises several zones. This composition varies with the nature of alpha-olefin being considered. Thus the percentage by weight of this alpha-olefin in this gas flow preferably is between 15 and 40% for butene-1 and between 35 and 56% for hexene-1.

The process of the invention is implemented in continuous manner using autoclave or tubular reactors in the conventional manner for polymerizing ethylene under high pressure. In order to precisely control the fluidity coefficient of the copolymer, the polymerization can be advantageously carried out in the presence of up to 2% moles of hydrogen.

The compositions of the invention do not form a simple juxtaposition of macromolecules with different structures, but rather a co-crystallization of the macromolecules comprising the invention arises at a temperature distinct from the crystallization temperature of each of the separate polymers. Thus the compositions of the invention have a differential enthalpic analysis diagram that shows, in addition to the crystallization peaks of each constituent, a crystallization peak situated between the other peaks. The exact co-crystalliztion temperature depends on the average proportion of α-olefin units in the copolymer and on the weight percentage of the copolymer in the overall composition.

The melt index of the free-radical ethylene polymer should be choosen fairly precisely. For the sheathing of telephone cables, a melt index between 0.15 and 0.45 dg/min is preferred.

A third polymer constituent may be added to the previously described compositions for some applications of the invention.

Unlike to the teaching of U.S. Pat. No. 3,176,052, the gloss of the films of the invention is lower than that of films obtained from each constituent. The gloss of α-olefin copolymers used according to the present invention is much higher than that of the copolymers described in U.S. Pat. No. 3,176,052, and thus the lower gloss is not disadvantageous. The films obtained from the invention have numerous uses in the packaging industry.

The invention may also be used for manufacturing retractable housings having a thickness generally between 25 and 150 μm, by means of extrusion-blowing using a blow ratio between 1.5 and 5. The retractable housings advantageously have shrinking strengths that lower when hot, and cohesion strengths, when cold, higher than that of retractable housings manufactured from only free-radical ethylene polymer.

In the manufacture of retractable housings, up to 15 weight percent, with respect to the sum of the free-radical ethylene polymer and the ethylene/α-olefin copolymer, of high density polyethylene may be added to the composition. The expression "high density polyethylene" means an ethylene homopolymer or copolymer with a specific gravity between 0.95 and 0.97, generally obtained by means of Ziegler catalysis. In the sheathing of telephone cables, it will be possible to add, for example, up to 10 weight percent, with respect to the sum of free-radical ethylene polymer and ethylene/α-olefin copolymer, of an ethylene/vinylacetate copolymer having a high vinylacetate content (for example from 20 to 40 weight percent) and a melt index between 3 and 20 dg/min.

The different types of polymers that are constituents of the invention are very readily miscible to form homogeneous mixtures. The invention can therefore be prepared without difficulty by any of the techniques for mixing polymers, in particular mixing granules in the solid state at ambient temperature and mixing in the molten state under the action of heat.

The invention makes it possible to manufacture, by extrusion, films which have a thickness between 8 and 20 μm, certain properties of which are improved when compared with the films made from each polymer of the mixture. These films are distinguished in particular by their impact resistance, the hot resistance of the welds, the haze and the tensile properties (ultimate tensile strength, elongation at break and impact resistance under tension).

EXAMPLES 1 to 4

Films are prepared by blow extrusion from compositions comprising: (A) an ethylene/but-1-ene copolymer which has a melt index (measured according to ASTM Standard Specification D 1238-73) equal to 0.8 dg/min, a density (measured according to French Standard Specification T 51-063) equal to 0.919 g/cm³, a number-average molecular weight (measured by gel permeation chromatography) of 43,000, a polydispersity index Mw/Mn of 3.6, an average molar proportion of a but-1-ene units equal to 3.2%, a total unsaturation ratio of 0.39 double bonds per 1000 carbon atoms, a melting point of the crystalline fraction (determined by differential enthalpic analysis) equal to 122° C., and in which the heterogeneity of the distribution of the but-1-ene (determined by a copolymer fractionation test) is expressed as the multiple (2.2 times) and the sub-multiple (0.5 times) of the average proportion between which the proportion of but-1-ene units varies according to the fractions considered, and which is obtained according to example 5 of European Pat. No. 0,070,220; and (B) an ethylene homopolymer obtained in the presence of a free-radical initiator and having a density of 0.921 g/cm³ and a melt index of 1.1 dg/min.

The conversion conditions are as follows:
temperature of the composition: 200° C.
speed of rotation of the extrusion screw: 80 rpm
blow ratio: 3.0.

Along with the weight percent of copolymer (A) in the composition, Table I shows the results of the measurements, on 50 μm thick films, of the following properties:

ultimate tensible strength in the longitudinal direction, UTSL (expressed in kg/cm²), and elongation at break in the transverse direction, EBT (expressed in %), both determined according to ASTM Standard Specification D 882-67, hot resistance of the welds, HRW (expressed in g/μm), determined according to TAPPI Standard Specification T 683 SU 72, optical gloss (G), (expressed in %), determined according to ASTM Standard Specification D 2457.

For each composition, the same table also shows the industrial stretchability limit (IS), expressed in μm, the lowest thickness which allows continuous manufacture to be maintained without breakage of the tubular film for a period of 2 hours.

TABLE I

| Example | 1 | 2 | 3 | 4 |
| --- | --- | --- | --- | --- |
| (A) % | 0 | 10 | 50 | 100 |
| UTSL | 150 | 170 | 205 | 210 |
| EBT | 415 | 475 | 640 | 710 |
| HRW | 1.5 | 2.0 | 7.5 | 15.5 |
| IS | 30 | 27 | 16 | 8 |
| G | 90 | 82 | 92 | 99 |

Compositions similar to those described above, but comprising respectively 65 and 75% of copolymer (A) have hot resistance of the welds equal to 13 and 22.5 g/μm, respectively.

Examples 1 and 4 are obviously comparative examples. The values of the tensile properties of the compositions of the invention are unexpectedly greater than the arithmetic mean of the values of the properties of each of the pure polymers which comprise the invention. The same applies to the hot resistance of the welds when the proportion of the copolymer (A) is between 60 and 75 weight percent. The industrial stretchability values of the compositions of the invention are, advantageously and unexpectedly, less than the arithmetic mean of the industrial stretchability of each of the pure polymers which they comprise. The differential enthalpic analysis of the film of example 3, cooled from 200° C. to 100° C. in 4 seconds, shows, in addition to shoulders at 108° C. and 122° C. corresponding to the crystallization of each constituent of the mixture, a characteristic co-crystallization peak at 114° C.

EXAMPLES 5 to 8

Compositions comprising the following are converted to films by blow extrusion:

(A) the heterogeneous copolymer used in the previous examples, and (C) An ethylene homopolymer obtained in the presence of a free-radical initiator and having a density of 0.923 g/cm³ and a melt index of 0.3 dg/min.

The conversion conditions are the same as above, except for the temperature of the composition (205° C.).

Along with the weight percent of copolymer (A) in the composition and the industrial stretchability IS, Table II shows the results of the measurements, on 50 μm thick films, of the properties in Table I. Example 5 is comparative.

TABLE II

| Example | (A) % | UTSL | EBT | HRW | IS | G |
| --- | --- | --- | --- | --- | --- | --- |
| 5 | 0 | 180 | 300 | 2 | 90 | 47 |
| 6 | 10 | 190 | 400 | 7 | 77 | 48 |
| 7 | 40 | 210 | 560 | 25.5 | 47 | 55 |
| 8 | 75 | 210 | 655 | 17.5 | 20 | 79 |

EXAMPLES 9 to 12

Films by produced blow extruding compositions comprising:

(A) The heterogeneous copolymer used in the previous examples, and (D) an ethylene homopolymer obtained in the presence of a free-radical initiator and having a density of 0.924 g/cm$^3$ and a melt index of 2 dg/min.

The conversion temperatures are the same as above, except for the temperature of the composition (170° C.).

Along with the weight percent of copolymer (A) in the composition, and the industrial stretchability IS, Table III shows the results of the measurements, on 50 μm thick films, of the following properties:

hot resistance of the welds, HRW, expressed in g/μm and determined according to TAPPI Standard Specification T 683 SU 72, optical haze, H, expressed in % and determined according to ASTM Standard Specification D-1003, and impact resistance, IR, expressed in g/μ and determined according to ASTM Standard Specification D 1709-67.

By way of comparison, pure copolymer (A) has a haze H of 10.5% and an impact resistance equal to 3.0 g/μ. Example 9 is comparative.

TABLE III

| Example | (A) % | HRW | H | IR | IS |
| --- | --- | --- | --- | --- | --- |
| 9 | 0 | 2.5 | 6.0 | 1.9 | 20 |
| 10 | 10 | 3.5 | 6.2 | 2.1 | 18 |
| 11 | 40 | 9.5 | 6.5 | 2.6 | 13 |
| 12 | 75 | 15 | 6.7 | 2.9 | 9 |

EXAMPLES 13 to 15

Compositions comprising the following are converted to films by blow-extrusion:

(A) a heterogeneous ethylene/but-1-ene copolymer, similar to that used in the previous examples, except that its melt index is 0.9 dg/min, and its density is equal to 0.924 g/cm$^3$; and (E) an ethylene homopolymer obtained in the presence of a free-radical initiator and having a density of 0.922 g/cm$^3$ and a melt index of 0.7 dg/min.

The conversion conditions are as follows:
temperature: 250° C.
speed of rotation of the extrusion screw: 60 rpm
blow-ratio: 3.0.

In order to determine the ability of these films to form retractable housing with suitable quality, the following are measured, on 120 μm thick films:

hot shrinking strength in the transverse direction, HSST (expressed in g/cm$^2$)

cold cohesion strength in the longitudinal direction, CCSL (expressed in kg/cm$^2$).

Table IV shows the results of the measurements and the proportion, by weight, of copolymer (A). Example 13 is comparative.

For the manufacture of retractable housings, films having a hot shrinking strength as low as possible and a cold cohesion strength as high as possible are preferred.

TABLE IV

| Example | (A) % | HSST | CCSL |
| --- | --- | --- | --- |
| 13 | 0 | 113 | 12.0 |
| 14 | 20 | 71 | 19.0 |
| 15 | 40 | 87 | 19.4 |

EXAMPLES 16 (comparative) and 17

Compositions of ethylene polymers comprising 2.5 weight percent carbon black, are converted by tube extrusion for sheathing telecommunication cables. The composition of example 16 comprises 92.5 weight percent free-radical polyethylene having a melt index of 0.3 dg/min, and 5 weight percent ethylene/vinylacetate copolymer comprising 28 weight percent vinylacetate. The composition of example 17 comprises 68.8 weight percent of the same free-radical polyethylene, 7 weight percent of the same ethylene/vinylacetate copolymer and 21.7 weight percent of a heterogeneous ethylene/-but-1-ene copolymer similar to those which were used in the previous examples, except its melt index (equal to 2.5 dg/min), its density (equal to 0.919 g/cm$^3$) and its polydispersity index (equal to 7).

The following properties were measured on the extruded tubes:

elongation at break, EB (expressed in %) determined immediately after extrusion, according to French Standard Specification NF T 51-034, elongation at break after aging, EBA (expressed in %) determined after thermal aging at a temperature of 100° C. for 240 hours, according to French Standard Specification NF T 51-034, crazing resistance CR (expressed in hours) determined according to French Standard Specification NF T 51-170.

Table V shows the results.

TABLE V

| Example | EB | EBA | CR |
| --- | --- | --- | --- |
| 16 | 275 | 100 | 45 |
| 17 | 520 | 495 | >240 |

The compositions of the invention display a remarkable aging stability of dynamometric properties (elongation at break), and a considerable improvement of the crazing resistance with respect to prior known compositions is also shown. The composition of example 17 satisfies French Standard Specification CM 24 of the Centre National d'Etudes des Telecommunications (Telecommunications Studies National Center) and satisfies the German Standard Specification FTZ 72 TV1 of the Bundespost (German Federal Postal Services).

It will be apparent to those skilled in the art that various modifications may be made in the composition of the invention without departing from the scope or spirit of the invention.

What is claimed is:

1. A composition comprising (a) from 25 to 95 weight percent of at least one free-radical ethylene polymer having a melt index between 0.15 and 2 dg/min, the free radical ethylene polymer being obtained by polymerization under high pressure and high temperature conditions and (b) from 5 to 75 weight percent of at least one ethylene α-olefin copolymer, wherein said α-olefin contains at least 4 carbon atoms, wherein said copolymer has a specific gravity between 0.905 and 0.940 and an average proportion of α-olefin units between 1 and 8 mole percent, said copolymer comprising both crystalline fractions and amorphous fractions and having a melt index between 0.4 and 3 dg/min, wherein said crystalline fractions of said copolymer have a single melting peak between 118° and 130° C. and represent from 20 to 50 weight percent of the total copolymer, the copolymer having a polydispersity index of between about 3 and about 9 for binary polymers and between about 4 and about 12 for ternary polymers;

wherein the distribution of α-olefin units in the copolymer is heterogeneous, and wherein the proportion of α-olefin units in the copolymer varies between at least 0.2 and at most 5 times the average proportion of α-olefin units in the various fractions.

2. The composition of claim 1, wherein said ethylene/α-olefin copolymer has a molecular weight between 15,000 and 60,000.

3. The composition of claim 1, wherein said copolymer contains two α-olefins, in a ratio of respective average proportions between 0.25 and 4.

4. The composition of claim 1, wherein said α-olefins are selected from the group consisting of but-1-ene, hex-1-ene, 4-methylpent-1-ene, and oct-1-ene.

5. The composition of claim 1, wherein the total unsaturation ratio of said copolymer is between 0.25 and 0.50 double bonds per 1000 carbon atoms.

6. The composition of claim 4, wherein the total unsaturation ratio of said copolymer is between 0.32 and 0.45 double bonds per 1000 carbon atoms.

7. The composition of claim 1, wherein said free-radical ethylene polymer has a melt index between 0.15 and 0.45 dg/min.

8. The composition of claim 1, further comprising up to 15 weight percent high density polyethylene, with respect to the sum of free-radical ethylene polymer and ethylene/α-olefin copolymer.

9. The composition of claim 7, further comprising up to 10 weight percent, with respect to the sum of free-radical ethylene polymer and ethylene/α-olefin copolymer, of an ethylene/vinylacetate copolymer with a melt index between 3 and 20 dg/min and comprising 20 to 40 weight percent vinylacetate.

10. A film having a thickness of between about 8 and 200 μm and made from the composition of claim 1.

11. A retractable housing having a thickness of between about 25 and 150 μm and made from the composition of claim 1.

12. A tube for sheathing telecommunication cables made from the composition of claim 1.

* * * * *